United States Patent Office 3,438,099
Patented Apr. 15, 1969

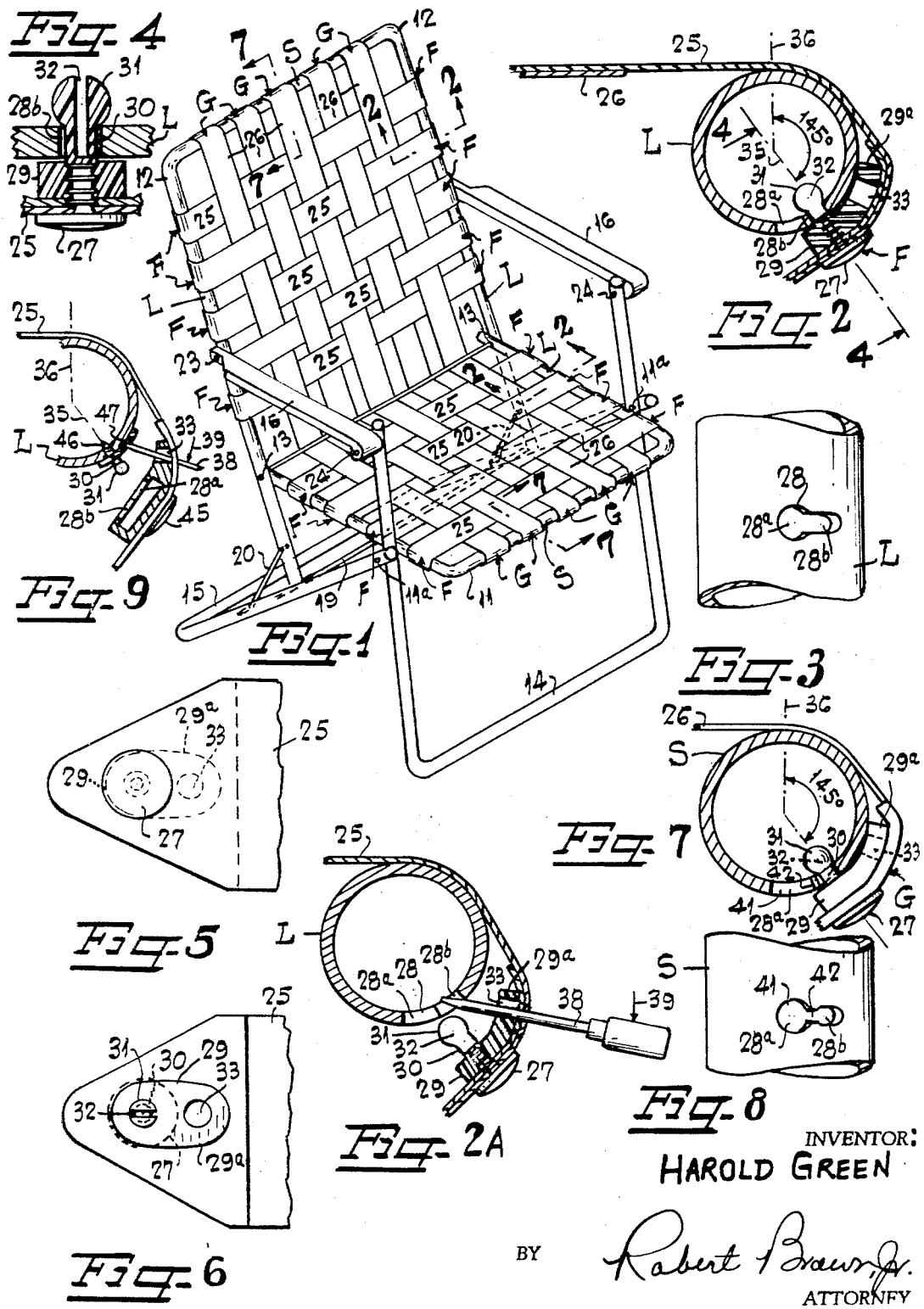
April 15, 1969 — H. GREEN — 3,438,099
FASTENER CONNECTIONS
Filed Oct. 13, 1967
INVENTOR:
HAROLD GREEN
BY Robert Braun Jr.
ATTORNEY

3,438,099
FASTENER CONNECTIONS
Harold Green, Phoenix, Ariz.
(358 S. Camden Drive, Beverly Hills, Calif. 90212)
Continuation-in-part of application Ser. No. 444,775,
Apr. 1, 1965. This application Oct. 13, 1967, Ser.
No. 675,136
Int. Cl. A44b 17/00
U.S. Cl. 24—222        4 Claims

ABSTRACT OF THE DISCLOSURE

A releasable snap fastener connection composed of an axially slotted stud element having an enlarged head portion and a restricted neck portion, which portions are insertable to fastened positions, first axially and then transversely, into the larger and smaller areas respectively of a keyhole slot in a female element. The fastener elements are provided with a pair of alignable apertures for receiving an elongated tool to align the stud and slot and to produce transverse tension therebetween preparatory to connecting the fastener elements.

---

The present application is a continuation-in-part of my copending patent application Ser. No. 444,775, filed Apr. 1, 1965, now Patent No. 3,367,392.

This invention relates to releasable snap fasteners and more especially to improvements in fasteners in which a radially contractible stud element is insertable to fastened position into a slot of a female element.

It is an object of this invention to provide a releasable fastener comprising an axially slotted stud element which is movable to two successive fastened positions into a keyhole slot, first in an axial direction and then transversely thereof.

It is another object of invention to provide a fastener of the type described in the preceding paragraph in which means are provided for releasably confining the stud member against axial detachment from its first fastened position and a second means for releasably confining the stud against transverse detachment from its second position.

It is a further object of invention to provide a releasable snap fastener connection for framed flexible panels of furniture, litters and the like in which means are provided for prestressing the panels simultaneously with the alignment and connection of the fastener parts. This feature consists of alignable apertures in the respective fastener parts, which apertures are spaced from the male and female elements so that the alignment of the apertures will substantially align the latter elements preparatory to making a fastener connection.

Some of the objects of invention having been stated, other objects will appear as the description proceeds when taken in connection with the accompanying drawings, in which:

FIGURE 1 is an isometric view of a collapsible lawn chair embodying my invention;

FIGURE 2 is an enlarged sectional view taken along lines 2—2 in FIGURE 1, showing a transversely flexible panel strap detachably secured to the frame under tension;

FIGURE 2A is a view similar to FIGURE 2 but further illustrating the manner of tensioning the strap while attaching it to the frame;

FIGURE 3 is an enlarged detail view of a typical keyhole slot for receiving the stud element to attach the transverse flexible straps to the frame under tension;

FIGURE 4 is an enlarged sectional view taken along line 4—4 in FIGURE 2 and showing a typical slotted stud fastener element;

FIGURE 5 is a top plan view of a panel strap end and the associated stud element;

FIGURE 6 is a view of the reverse side of FIGURE 5;

FIGURE 7 is an enlarged sectional view taken along lines 7—7 in FIGURE 1, showing the manner in which a longitudinal flexible panel strap is secured to the chair framework;

FIGURE 8 is a detail view similar to FIGURE 3, showing a typical keyhole slot for receiving the stud element to attach the longitudinal flexible straps to the framework;

FIGURE 9 shows a modified form of a fastener connection in which the positions of the male and female elements are reversed from that in the previously described figures.

A typical embodiment of the framed flexible panel is incorporated in the collapsible lawn chair shown in FIGURE 1; however, it is apparent that numerous other applications are possible such as on other types of furniture, litters, waiter tray stands and seat belts.

Referring more specifically to the drawings, the numerals 11 and 12 respectively denote the seat and back U-frame portions of the chair. The legs of frame portions 11 and 12 are pivotally secured together as at 13 to form an open substantiially rectangular framework which has opposite longer sides L, L and adjacent opposite shorter sides S, S.

A flexible load-supporting panel o rcover, formed from interlaced webbing straps 25 and 26, is secured to and between the framework sides as hereinafter more fully described. Although the flexible panel is illustrated as interlaced straps, it is to be understood that a solid flexible sheeting may be employed to cover the desired area.

The shorter transverse straps 25 remain in tensioned condition at all time after installation, whereas, the longer straps 26 are in tensioned conditioned when the chair is erect and untensioned when the chair is collapsed. Accordingly, the fastener elements for straps 25 and 26 are slightly different to accommodate these conditions.

Further construction which renders the chair collapsible comprises the pivotal connection of U-frames 14 and 15 as at 11a, a pair of links 20 pivotally connected to and between the legs of U-frames 12 and 15, and a pair of arm rests 16 pivotally connected as at 23 and 24 between U-frames 12 and 14, all in a well-known manner.

The transverse shorter straps 25 are secured at points F to the longer frame sides L by means of studs 27 and keyhole slots 28 (FIGURES 1, 2, 2A, 3, 5 and 6), a stud 27 being secured to each end of a strap 25 and a slot 28 being provided in the frame side L for releasably receiving the stud. Stud 27 has a flange portion 29, a restricted neck portion 30, and an enlarged head portion 31 integral with said neck portion. The head and neck portions 30 and 31 are bifurcated by an axially extending slot 32 thereby rendering these portions resiliently contractible. The stud flange 29 has integral therewith an arcuate extension 29a with a curvature the same as the exterior of the exterior of the frame side L, said extension having an opening 33 therein for use when attaching the flexible panel to the frame as later described.

Keyhole slot 28 is located along line 35 extending radially of side L (FIGURE 2), said line being positioned approximately at an angle of 145 degrees relative to a second radial line 36 which, in turn, is positioned substantially at right angles to the load-supporting surface of strap 25. Specifically, the slot 28 comprises an enlarged round area 28a, and adjacent relatively narrow slot area 28b. Area 28a is similarly shaped and of slightly less diameter than that of stud head 31 whereas, the width of slot area 28b is substantially the same as the diameter of neck portion 30.

It will be observed from FIGURES 2, 2A and 5 that the opening 33 in stud flange 29 is normally concealed by the strap 25. In order to install a strap 25 on the frame under tension, the end of a pointed tool 38 (FIGURE 2A) is caused to penetrate the strap 25, the opening 33 and the keyhole slot area 28b, after which the tool is rotated in the direction of arrow 39 until the stud head is axially aligned with larger keyhole area 28a. Then the stud is axially inserted into area 28a during which the bifurcated stud head portion 31 will contract sufficiently to permit passage thereof. Following insertion of head portion 31, the tool 38 is removed to permit the stress in the strap 25 and the deflected frame sides L, L to draw the stud neck portion 30 into firm engagement with the end of slot area 28b.

It will be observed that the distance from slot area 28a to 28b corresponds sufficiently close to the distance between aperture 33 and stud head 31 to permit tool 38 to be inserted prior to and during alignment of the fastener elements and the tensioning of the strap (FIGURE 2A).

As previously stated, the longer straps 29 are not under tension when the chair is collapsed and, therefore, additional means at points G are provided for preventing the stud neck portion 30 from becoming disengaged from keyhole slot area 28b. Accordingly, each slot 41 and its associated slot areas 28a and 28b at points G is provided with a constriction 42 between the latter areas, said constriction being slightly narrower than slotted neck portion 30 of stud 27 but sufficiently wide to be releasably confined within area 28b once it has been inserted. Except for the construction 42, the connection at point G is substantially the same as at point F.

FIGURE 9 is a modified form of fastener connection similar to that shown in FIGURE 2A, but with the fastener elements reversely positioned. Specifically, the strap 25 has a keyhole slotted element 45 attached thereto in which previously described slot areas 28a and 28b are formed. During attachment of the strap to frame side L, the slots 28a and 28b will successively receive head and neck portions 31 and 30 respectively of a stud 46, said stud being threadably secured in hollow frame member L.

The flange of stud member 46 is apertured as at 47. During the attachment of the webbing to the frame side L, the tool 38 is caused to penetrate webbing 25, aperture 33 and aperture 47, and then rotated as previously described to align and tension the fastener parts and webbing respectively as previously described. It is evident that the tool 38 serves as a lever when inserted into either the apertures 33 and 47 of FIGURE 9 or the apertures 33 and 28b of FIGURE 2A.

Preferred embodiments of the invention have been illustrated in the drawings and specific terms employed in the specification to describe them. Any such specific terms, however, are used in a generic sense and not for purposes of limitation, the scope of the invention being defined in the following claims.

I claim:

1. A releasable fastener comprising a first element having a stud thereon, a second element having a recess therein for axially receiving said stud, means including alignable lever-receiving apertures in said elements respectively for aligning said stud and recess preparatory to connecting the elements, said stud element comprising an axially bifurcated head and neck portion to provide contractibility transversely of the stud axis, and said recess comprising a keyhole slot having a relatively large area for permitting the axial insertion of said head portion and an adjacent smaller area for the subsequent reception of said neck portion transversely of the stud axis.

2. A fastener connection as defined in claim 1 wherein said larger area is smaller than said head portion and larger than said neck portion whereby an inserted head portion will be releasably confined against axial detachment.

3. A fastener connection as defined in claim 1 and further comprising means for yieldingly resisting passage of said neck portion transversely between said areas.

4. A fastener connection as defined in claim 2 and further comprising means including a restricted slot portion for yieldingly resisting passage of said neck portion between said areas.

References Cited

UNITED STATES PATENTS

| | | | |
|---|---|---|---|
| 487,822 | 12/1892 | Booth | 24—214 |
| 1,891,637 | 12/1932 | Frank | 24—222 |
| 2,184,250 | 12/1939 | Chaffee. | |
| 2,246,852 | 6/1941 | Kale | 24—224 |
| 2,727,771 | 12/1955 | Adams | 24—214 |
| 3,102,318 | 9/1963 | Van Buren. | |
| 3,170,215 | 2/1965 | Hopkins | 24—265 |

FOREIGN PATENTS 192,494  12/1907  Germany.

BERNARD A. GELAK, *Primary Examiner.*

U.S. Cl. X.R.

24—213, 224, 265; 160—404